Patented Oct. 16, 1923.

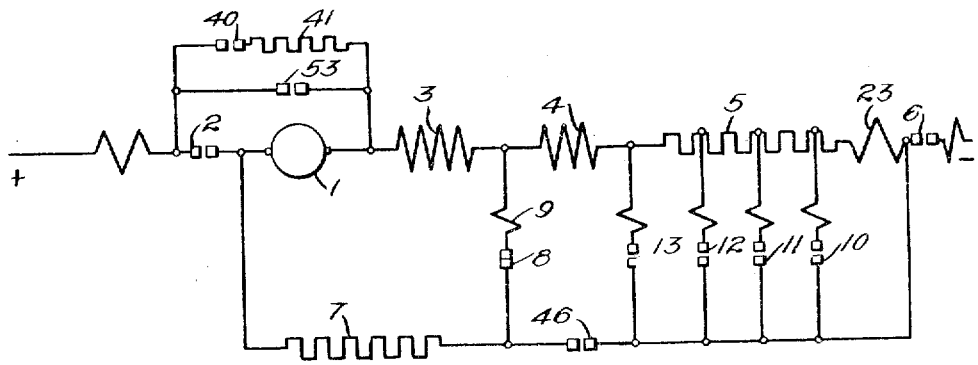

1,470,759

UNITED STATES PATENT OFFICE.

FRED M. PARKS, OF MURRAYSVILLE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed December 21, 1920. Serial No. 432,332.

*To all whom it may concern:*

Be it known that I, FRED M. PARKS, a citizen of the United States, and a resident of Murraysville, in the county of Westmoreland and State of Pennsylvania, have invented a new and useful Improvement in Systems of Control, of which the following is a specification.

My invention relates to motor-control systems and particularly to such systems as are employed with cranes, hoists and similar mechanisms.

The object of my invention is to provide means for controlling the speed of an electric motor under all conditions of load and for accomplishing the desired result smoothly and without imposing abnormal strains on the motor or other parts of the system.

In lowering a heavy load on a crane, the operator may suddenly move the handle of the master switch from the full-speed position toward the off position. In the operation of the ordinary system of control, it is necessary to perform this operation with care and not to effect dynamic braking connections until after the motor speed has been considerably reduced.

According to the present invention, a system is provided with a series motor which is controlled by a master switch in such manner that, in one direction of rotation, when the load is to be hoisted, the motor is started in the usual manner with series connections, including an accelerating resistor. The speed is readily controlled by shunting portions of this resistor, the motor being protected by "current-limit" means.

When it is desired to reverse the motor, as in lowering a load, the armature connections are reversed and the field-magnet winding is connected in shunt relation to the armature. The accelerating resistor is now connected in series with the field-magnet winding. An auxiliary resistor and the dynamic-braking resistor are connected in the armature circuit in series relation to limit the initial rush of current. The motor starts under the influence of line voltage and also that of the superimposed load to be lowered by the crane. When the desired lowering speed is attained, it is thereafter maintained or varied at the will of the operator by regulating the strength of the motor field.

In bringing the load to rest, the operator may, with the present system, return the master switch at once to the off position and rely on the automatic means provided to gradually shunt the resistor from the field circuit to procure graduated regenerative braking prior to disconnecting the motor from the line and prior to establishing the final dynamic brake circuit for stopping and holding the motor. The motor speed is, therefore, first reduced by increased field excitation before final dynamic braking can be applied.

My invention will be described in connection with the accompanying drawings in which—

Fig. 2 is a diagrammatic view of the main circuits of the system of Fig. 1.

Fig. 3 is a sequence chart which indicates the order of operation of the several contactors.

Figure 1:
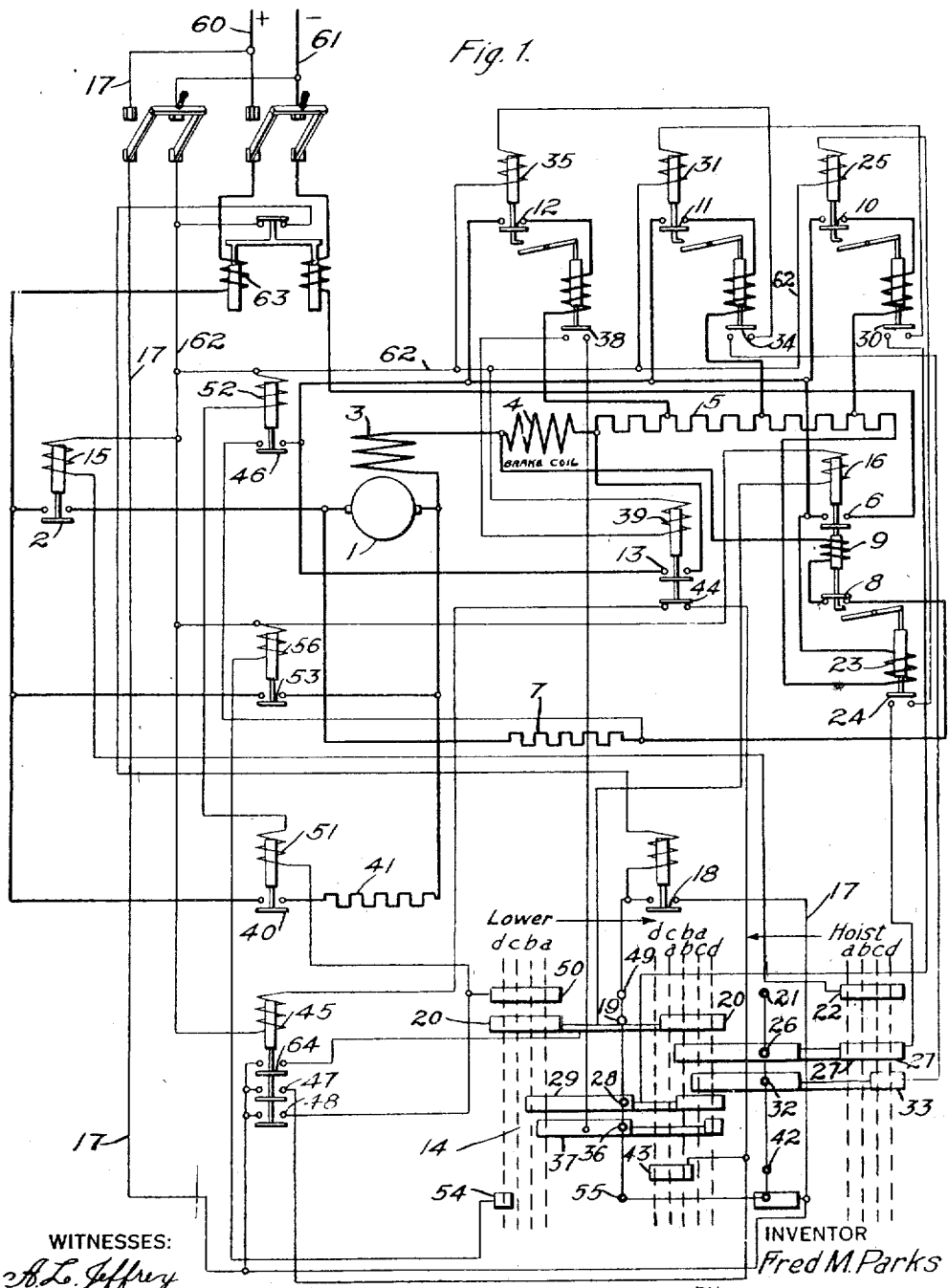
Fig. 1 is a diagrammatic view of circuits and apparatus embodying my invention.

The armature 1, which is connected, through a contactor 2, to a positive line conductor 60, has a field-magnet winding 3. A brake-magnet coil 4 and an accelerating resistor 5 are connected in series relation and complete the main circuit through a contactor 6, to a negative line conductor 61. A dynamic-braking resistor 7 is connected in circuit with the armature and the field-magnet winding 3 through contactor 8 and its operating coil 9. Contactors 8 and 6 are so connected mechanically that contact 8 opens when contact 6 closes. When the motor is connected for hoisting, namely, with the contactors 2 and 6 closed, the resistor 5 is shunted by contactors 10, 11, 12 and 13 successively to accelerate the motor. The various speeds in hoisting are selected by a master switch 14.

It may be assumed that the several contactors are in their inoperative positions when power is supplied from conductors 60 and 61, through the illustrated knife switches, no-voltage relay 18 immediately closes, according to a well known practice. To start the hoisting operation, the master switch is operated to its first hoist position *a* to close contactors 2 and 6 by means of their respective operating coils 15 and 16. The circuit of coil 16 may be traced from the positive line conductor 60, through conductor 17, no-voltage relay 18, contact finger 19, contact segment 20, coil 16 and conductor 62, to the negative line conductor 61. The circuit of coil 15 extends from no-voltage relay 18, which is connected to the positive line conductor 60, through contact finger 21, contact segment 22 and coil 15, to conductor 62. The motor circuit extends from line conductor 60, through contactor 2, armature 1, series field-magnet winding 3, brake-magnet coil 4, resistor 5, relay coil 23 of series relay 24 and contactor 6, to the line conductor 61.

After the current traversing relay coil 23 drops to a predetermined value, the relay closes, and the accelerating contactor 10 is closed by its operating coil 25, with the master switch still in the first hoist position. The circuit of coil 25 extends from no-voltage relay 18, through contact finger 26, contact segment 27, relay 24 and coil 25, to conductor 62.

When the master switch occupies position $b$, a circuit is established from relay 18 through contact members 28 and 29, relay 30 and coil 31 of contactor 11 to conductor 62. Contactor 11 then closes to shunt a portion of accelerating resistor 5. It should be noted that each accelerating relay is mechanically interlocked with a contactor, as are relay 8 and contactor 6, so that each contactor, in closing, energizes the corresponding relay coil and releases the relay from its interlocked position, after which the relay may complete the control circuit for the actuating coil of the next accelerating contactor when the current in the main circuit traversing the relay coil has fallen to a predetermined value.

In position $c$, the master switch establishes a circuit from the relay 18, through master-switch contact members 32 and 33, relay 34 and coil 35 of contactor 12, to conductor 62, thereby effecting the closing of contactor 12 to shunt another portion of resistor 5.

In position $d$, the master switch establishes a circuit through relay 18, master switch contacts 36 and 37, relay contact 38 and coil 39 to the negative line, thereby effecting the closing of contactor 13 to shunt the remaining portion of resistor 5.

In stopping, the master switch is returned to the off position. The several contactors open, whereby the motor is disconnected from the line. The dynamic-braking contactor 8, which is interlocked with the contactor 6, is closed by gravity and held in that position by a coil 9.

To reverse the motor to lower the load, the master switch is actuated to the right, as viewed in Fig. 1, to position $a$. The contact finger 19 and contact segment 20 complete a circuit for the actuating coil 16 of contactor 6, as previously traced. Contact finger 49 engages contact segment 50 to complete a circuit which extends from relay 18 through contact members 49 and 50, coils 51 and 52 of contacts 40 and 46, respectively. The contactors 6, 40 and 46 close to complete a circuit which extends from line conductor 60, through contactor 40, resistor 41, armature 1, resistor 7, contactor 46 and contactor 6, to the line conductor 61. The closure of contactor 6 opens contactor 8.

In position $a$, the first point of the master switch in lowering, the coils of the respective contactors 10, 11, 12, and 13 are energized by circuits similar to those previously traced, and the contactors close to shunt the resistor 5 to provide maximum field excitation of the motor. The circuit of the field-magnet winding now extends from conductor 60, through overload relay coil 63, contactor 40, resistor 41, field-magnet winding 3, brake-magnet coil 4, and contactors 13 and 6, to the negative line. The motor is now connected as a shunt motor and operates at its lowest speed under maximum field excitation.

In position $b$ of the master switch, contactor 13 is opened by the actuation of contact segments 37 out of engagement with contact finger 36, breaking the circuit of coil 39. Contactor 12 is opened when its coil 35 is de-energized upon the separation of contact segment 33 from contact 32. This action inserts a section of resistor 5 previously shunted by contactors 12 and 13 and results in weakening the field to increase the motor speed. A relay circuit is established from relay 18, contact finger 42 and contact segment 43, interlock 44 of contactor 13 and coil 45 to conductor 62. The function of the relay controlled by coil 45, which now closes its contacts 47, 48 and 64, will be brought out later.

Actuation of the master switch to position $c$ disengages contact segment 28 from contact finger 29, opening the circuit of coil 31 to open contactor 11. Also, the separation of contact segment 27 from contact 26 de-energizes the coil 25 to open contactor 10. All of resistor 5 has now been inserted in circuit with the field-magnet winding, and the motor speed is further increased.

In position $d$, contact segment 54 engages contact finger 55 to complete a circuit for actuating coil 56 of contactor 53. The contactor 53 closes to shunt resistor 41. It is assumed that the motor has attained such speed that it is safe to remove resistor 41 from the armature circuit. The motor now operates at its maximum speed.

When the motor overspeeds in lowering, or if it is desired to stop, the operator returns the master switch toward the off position. If he passes quickly to the off position from full speed, contactors 10, 11, 12 and 13 are closed in the order named to gradually strengthen the field and diminish the speed of the motor. Contactors 40 and 46 are maintained closed during the slow-down operation. Their actuating coils 51 and 52 are connected across conductors 17 and 62, through relay 48.

Contactor 8 closes only after contactor 13 starts to close because it is mechanically interlocked with contactor 6 the operating coil of which is maintained energized by the relay 64, and relay 64 does not open until coil 45 is de-energized upon the opening of interlock 44, and the closure of contactor 13. The energization of relay coil 45 is maintained by a holding circuit through relay 47 and interlock 44.

When contactors 10, 11 and 12 have closed, the motor is so reduced in speed that contactor 8 may be closed to effect dynamic braking. This is accomplished by the closure of contactor 13 to open the interlock 44, thereby de-energizing relay coil 45, opening contactor 46 and de-energizing coil 16 of the dynamic-braking contactor 8. The motor is then brought to rest.

In a system as described, the motor is controlled in the hoisting direction in a usual manner, namely, acceleration controlled by "current-limit" devices and deceleration by resistors in the armature circuit, assisted by the action of gravity on the hoist load. In the reverse or lowering direction, the rate of deceleration is not under complete control of the operator and means are provided to limit the rate of deceleration, since the action of gravity is adverse.

It will be recognized that a dynamic-braking resistor of low ohmic value is desirable, inasmuch as braking is usually accomplished from slow speed. However, an operator will frequently attempt to stop a heavy lowering load more quickly than should be attempted, thereby causing the load and the control system to handle excessive currents that produce destructive arcing at the motor commutator and at the control contactors. Undue mechanical strains are also induced. In the present system the equipment is automatically protected, as described, by insuring slow speed of the motor prior to dynamic braking.

I claim as my invention:

1. The combination with an electric motor, and dynamic-braking means for said motor, of means for insuring increased field excitation of said motor prior to dynamic braking, and means for rendering the second means ineffective.

2. The combination with an electric motor and dynamic-braking means for said motor, of means for insuring increased field excitation of said motor prior to dynamic braking, and means comprising a master switch, for rendering the second means ineffective.

3. The combination with an electric motor and dynamic-braking means for said motor, of a relay for insuring increased field excitation of said motor prior to dynamic braking, and a master switch for controlling said motor and for rendering said relay ineffective.

4. The combination with an electric motor and an accelerating resistor, of dynamic-braking means for said motor, means comprising said resistor for controlling the field excitation of said motor prior to dynamic braking and means comprising a relay and a master switch for controlling dynamic braking in accordance with the electrical connections of said accelerating resistor.

5. The combination with an electric motor and an accelerating resistor, of dynamic-braking means comprising a resistor and a contactor for connecting said resistor in circuit with said motor, and means comprising the accelerating resistor for insuring increased field excitation of said motor prior to dynamic braking in accordance with the electrical connections of said accelerating resistor.

6. The combination with an electric motor, and an accelerating resistor, of a plurality of contactors for shunting said accelerating resistor, a master switch for controlling said contactors, dynamic-braking means comprising a resistor and a contactor for connecting said resistor in circuit with said motor, means for insuring increased field excitation of said motor prior to dynamic braking, and means comprising a relay for controlling dynamic braking in response to the closure of said accelerating contactors.

7. The combination with an electric motor and an accelerating resistor, of a plurality of contactors for shunting said accelerating resistor, a master switch for controlling said contactors, dynamic-braking means for said motor, means comprising said master switch, said contactors and a relay for the shunting of said accelerating resistor prior to the closing of the dynamic-braking circuit to insure increased field excitation of the motor prior to dynamic braking.

8. The combination with an electric motor and an accelerating resistor, of a plurality of contactors for shunting said accelerating resistor, a master switch for controlling said contactors, means for maintaining the armature and field-magnet winding of said motor in circuit with the source of energy while shunting the accelerating resistor for insuring increased field excitation of the motor, dynamic-braking means comprising a resistor and a contactor for connecting said resistor in circuit with the motor and for controlling dynamic braking in response to the operation of one of said accelerating contactors.

9. The combination with an electric motor, and an accelerating resistor, of a plurality of contactors for shunting said accelerating resistor, means for controlling said contactors, dynamic-braking means comprising a resistor and a contactor for connecting the resistor in circuit with said motor, means comprising a plurality of contactors for maintaining the armature and field in circuit with the source of energy while shunting the accelerating resistor, means comprising said controlling means, said accelerating contactors and a relay responsive to the operation of one of said contactors for insuring the shunting of said accelerating resistor prior to the dynamic braking of said motor to insure increased field excitation prior to dynamic braking.

10. The combination with an electric motor and an accelerating resistor, of a plurality of contactors for shunting said accelerating resistor, means for controlling said contactors, means comprising the shunting of said accelerating resistor for increasing the field excitation of said motor, means comprising a relay and a plurality of contactors for maintaining the motor field and armature circuits prior to dynamic braking and means comprising said relay and a master switch for controlling dynamic braking in response to the operation of said accelerating contactors.

11. The combination with an electric motor and an accelerating resistor, of a plurality of contactors for shunting said accelerating resistor, dynamic-braking means, means for maintaining the motor armature and field circuits while shunting said accelerating resistor to insure increased field excitation of said motor prior to dynamic braking, means for controlling dynamic braking in response to the operation of said accelerating contactors and means for restoring said field and armature-maintaining means to normal positions substantially simultaneously with the application of dynamic braking.

12. The combination with an electric motor, and an accelerating resistor, of a plurality of contactors for shunting said resistor, dynamic-braking means, means for insuring increased field excitation of said motor prior to dynamic braking, means for controlling dynamic braking in response to the operation of the accelerating contactors, and means controlled by one of the accelerating contactors for disconnecting the motor field and armature from the source of energy after a slow speed of the motor has been obtained and substantially simultaneously with the application of dynamic braking.

In testimony whereof, I have hereunto subscribed my name this 9th day of December, 1920.

FRED M. PARKS.